United States Patent Office 3,062,766
Patented Nov. 6, 1962

3,062,766
QUATERNARY ALKOXY EMULSIFYING AGENTS, PROCESS OF MAKING SAME, AND EMULSIONS PRODUCED THEREWITH
Clyde Lee Aldridge and Edward Allen Hunter, Baton Rouge, La., assignors to Esso Research and Engineering Company, a corporation of Delaware
No Drawing. Filed Nov. 4, 1957, Ser. No. 694,096
9 Claims. (Cl. 260—29.7)

This invention relates to surface-active agents and particularly to emulsifying agents and the preparation thereof. More particularly, it relates to such agents prepared by the attachment of a hydrophilic group derived from a nitrogenous base to the hydroxy group of a primary monohydric alkoxy alcohol, especially a $C_{11}$ to $C_{27}$ alkoxy alcohol obtained from the bottoms product of the two-stage Oxo reaction known as the "Oxo bottoms." Still more particularly, it relates to cationic agents of the type described wherein the hydrophilic group is derived from pyridine.

Surface-active molecules generally comprise two portions: a hydrophobic, oil-soluble, water-insoluble portion; and a hydrophilic portion which is usually sufficiently water-soluble to render the entire molecule water soluble or dispersible. The most successful heretofore known surfactants are those wherein a long hydrocarbon chain comprises the hydrophobic group. However, all commercial surface-active agents have shortcomings in one way or another. Some are too expensive; others are not very efficient on a weight basis; others do not give stable enough emulsions; and still others are not suitable for emulsifying a wide enough variety of oils and polymers.

It is therefore an object of the present invention to produce a more efficient and versatile surface-active agent. It is a further object to produce such an agent in an inexpensive manner from inexpensive raw materials. A more specific object is to utilize the bottoms product of the Oxo reaction in the preparation of inexpensive surfactants. It is a still further object to prepare stable emulsions and latices of oils and polymers. These and other objects will become more apparent as the invention is described more fully below.

Surface-active agents may be divided into three major types: anionic, cationic, and nonionic. This invention relates to the cationic type agent wherein the portion of the molecule containing the hydrophobic group carries a positive charge in aqueous solutions and the hydrophilic group is derived from a nitrogenous base, such as the amines, etc. Any such nitrogenous base is believed to be suitable in this invention, but applicants have found that pyridine is particularly desirable.

It has now been found that especially effective emulsifying agents can be prepared from a $C_{11}$-$C_{27}$ primary monohydric alcohol having an alkoxy group substituted at the beta or gamma position. These alkoxy alcohols may be represented by the following formulae:

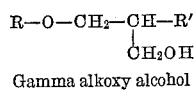

Beta alkoxy alcohol or

R—O—CH₂—CH—R'
        |
        CH₂OH

Gamma alkoxy alcohol wherein R represents an alkyl group having 5 to 13 carbon atoms, preferably 8 to 10 carbon atoms, and wherein R' represents an alkyl group having 3 to 11 carbon atoms, preferably 6 to 8 carbon atoms. The advantages inherent in the agents of the present invention arise principally from the novel structure of the alkoxy alcohol compound, as the hydrophobic moiety.

The above alkoxy alcohols may be conveniently isolated from a two-step process known as the Oxo process. See U.S. Patent 2,327,066. The product of that process which is useful in the present invention is isolatable from what is known as the "Oxo bottoms."

In the first stage of the Oxo process an olefinic material such as mixed $C_7$ olefin, a carbonylation catalyst such as a suitable form of cobalt, and CO and $H_2$ are reacted at pressures between about 1500 and 4500 p.s.i.g. and temperatures between about 150° and 450° F. to give a product which comprises aldehydes and alcohols of one higher carbon number. This material is decobalted by heating in the presence of hydrogen and is then hydrogenated over a conventional hydrogenation catalyst, e.g., nickel or the like, in the second stage to give predominately the corresponding alcohols. The desired alcohols are then separated from unconverted olefinic material, unhydrogenated carbonyl compounds and saturated hydrocarbons by distillation.

In the Oxo process, final distillation of the crude alcohol product results in a bottoms fraction representing about 10 to 30% of the crude alcohol charge to the distillation zone. This so-called "Oxo bottoms" comprises the final traces of the alcohol being distilled, high boiling residues introduced with the cobalt catalyst, and additional high boiling oxygenated compounds formed by further condensations and reactions of the initially formed aldehydes and alcohols.

The alkoxy alcohols useful in this invention can be isolated from this high-boiling bottoms fraction. Without wishing to limit this invention to any theory, it is believed that these alkoxy alcohols are formed by the following mechanism:

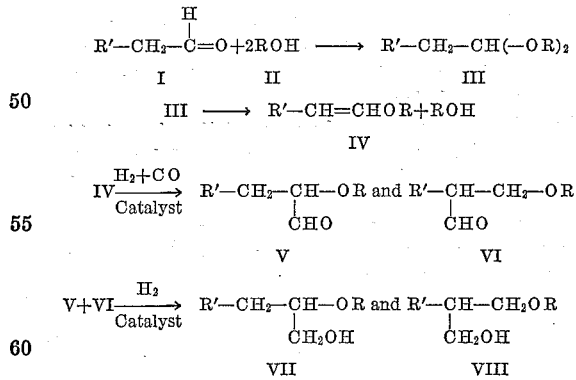

The initially formed Oxo aldehydes (I) and alcohols (II) react to form compounds III, IV, V and VI under carbonylation conditions, and are then hydrogenated to form the alkoxy alcohols VII and VIII. These alkoxy alcohols comprise about 10 to 40 weight percent of the total bottoms and may be easily separated by distillation.

The hydrophilic group is most often derived from a nitrogenous base such as amines, pyridine, quinoline, morpholine, etc. Preferred in the present invention are the cationic agents which are derived from the alkoxy alcohols and pyridine.

The emulsifiers of this invention may be prepared by reacting the alkoxy alcohol with formaldehyde and hydrogen chloride first and then with the nitrogenous base. More specifically, 1 mole of the alkoxy alcohol is contacted with an excess, e.g. to 1.5 moles, of formaldehyde in the presence of dispersion medium such as benzene, toluene, carbon tetrachloride, etc. About 1 to 1.5 moles of gaseous anhydrous hydrogen chloride, or a sufficient amount to saturate the dispersion, is then passed through the dispersion. This first step of the reaction is conducted at 20° to 100° C., preferably 30° to 50° C., for about 1 to 50 hours, usually about 2 to 6 hours, or until an organic phase and an aqueous phase are formed. The hydrogen chloride is added as absorbed during the course of the reaction, and the alcohol may be added incrementally during the course of the reaction.

An organic phase is separated and freed of excess hydrogen chloride by stripping with nitrogen or the like. One mole of the residual chloromethyl ether is reacted with 0.5 to 2.0 moles, preferably 0.8 to 1.2 moles of a nitrogenous base, e.g. pyridine, in hydrocarbon solution, e.g. with benzene, toluene, mineral spirits, etc. The reaction temperature may be 20°–100° C., preferably 30°–50° C. The pyridine solution is added over a period of 0.5 to 6 hours, preferably 1 to 2 hours, or until the temperature reaches a maximum. Following the pyridine addition, the mixture is refluxed for 0.5 to 5 hours, preferably 1 to 2 hours. The product salt is separated by stripping the volatile materials off at 20° to 100° C. and preferably at reduced pressures, e.g., 5 to 200 mm. Hg. The novel emulsifiers of this invention are not necessarily intended to be limited to any one method of preparation.

The presently claimed emulsifiers may be used alone, or combinations of a major portion of an emulsifier of this invention and a minor portion of one or more other surface active agents whose main functions are stabilization and foam inhibition may be used, the particular combination depending upon the oil or polymer being emulsified. Usually the emulsifier combination is a mixture of a nonionic supporting agent with the cationic agent of the present invention. Seldom are cationic and anionic agents mixed since the two systems are incompatible with one another. Preferred combinations are formulated from 1 part of the cationic agent and 0.1 to 1 part of one or more commercial nonionic agents.

The emulsions which may be prepared with the aid of the surfactants of this invention include those familiar to the textile industry, paper industry, dye industry, soap and detergent industry, synehtic rubber industry, and many others. The present emulsifiers are especially adapted for the preparation of polymer latices, particularly hydrocarbon polymer latices.

The polymers which may be so emulsified include high molecular weight polyisobutylene, prepared by the low temperature polymerization of isobutylene with Friedel-Crafts catalysts; olefin-multiolefin copolymers having an unsaturation below an iodine number of about 50, prepared by reacting the monomers in the presence of a Friedel-Crafts catalyst dissolved in an inert solvent (see U.S. Patent 2,356,128), such as a copolymer of about 97% isobutylene and 3% isoprene, known as butyl rubber; copolymers of 10–90% isobutylene and 90–10% styrene also prepared at low temperatures with Friedel-Crafts catalysts as described in U.S. Patent 2,274,749; liquid and solid polybutadiene and copolymers of butadiene and styrene prepared by mass polymerization with sodium at temperatures from 30°–100° C. as described in U.S. Patent 2,762,851; petroleum resins prepared by the low temperature Friedel-Crafts polymerization of steam-cracked petroleum streams (U.S. 2,734,046); and the like.

Stable aqueous emulsions and latices prepared with the emulsifiers of this invention usually comprise about 5 to 60 weight percent of the dispersed phase and about 1 to 15%, preferably 2 to 8%, of the emulsifier, based on the dispersed phase. Stable latices from preformed polymers are prepared by dissolving the polymer in a suitable solvent such s hexane, carbon tetrachloride, diisobutylene, heptane, benzene, etc., and then emulsifying the solution in water by the use of the present emulsifiers. The emulsion may then be stripped essentially free of organic solvent by use of heat, vacuum, or other conventional means. If desired, this stripping may be extended to remove a portion of the water phase and to concentrate the latex. Especially adaptable to such latices is butyl rubber, which latex will contain about 20 to 50% solids and 0.2 to 5.0% of the present emulsifiers, based on the latex. The remainder of the latex comprises other surface active agents and water.

The following examples will illustrate, but not limit, the preparation and usefulness of the compounds of this invention.

Unless otherwise designated, all percentages and ratios are given on a weight basis throughout this application.

EXAMPLE I

A mixture of 47.3 grams (1.5 moles) of formaldehyde (paraformaldehyde) with 500 cc. of benzene was placed in a 2 liter glass reaction vessel at room temperature and saturated with dry hydrogen chloride. A second solution of 420 grams (1.5 moles) of the mixed $C_{17}$ beta and gamma alkoxy alcohols (B.P. 360°–390° F. at 20 mm. Hg; $d_4^{27}$, 0.8599; $n_D^{27}$, 1.4451) obtained from the Oxo bottoms of a $C_8$ Oxo alcohol process in 250 cc. of benzene was gradually added to the first-mentioned solution while constantly stirring and passing hydrogen chloride through the vessel over a period of 3.5 hours. The resulting mixture was allowed to stand for 36 hours, and the aqueous phase separated from the organic phase. After separation of 46 grams of aqueous phase, 200 cc. of benzene containing the excess formaldehyde and hydrogen chloride was distilled from the organic phase at atmospheric pressure. The remaining mixture was then stripped with nitrogen at reflux for 4 hours to remove final traces of hydrogen chloride and other impurities. The foregoing reaction may be represented by the following equation:

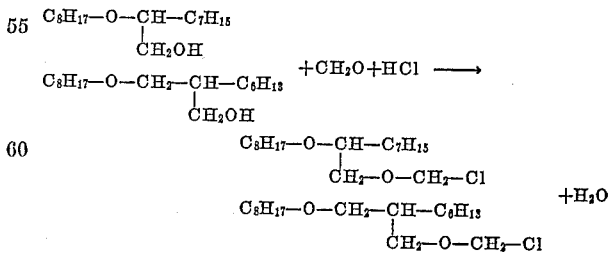

A solution of 118.5 grams (1.5 moles) of pyridine in 210 cc. of benzene was then added in 50 cc. increments about every 15 minutes to the solution of the chloromethyl ether intermediate. The temperature rose about 5° C. with every increment until the temperature reached about 45° C. after the 2-hour period. The resulting solution was then stripped in a distilling flask to a 65° C. pot temperature at 10 mm. Hg pressure thereby removing the volatile materials overhead and leaving 605 grams of the nonvolatile pyridinium salt product as the residue. The theoretical yield was 600 grams. This second reaction may be represented as follows:

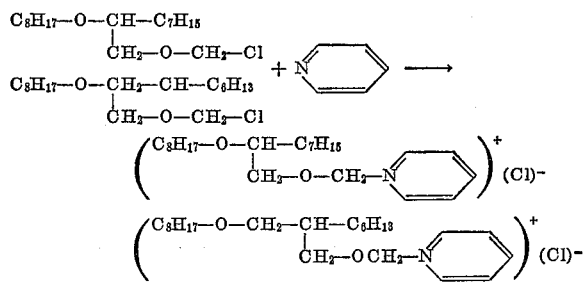

This pyridinium salt is quite water soluble; 27.0 g. readily dissolved in 100 cc. of water at room temperature.

EXAMPLE II

In order to compare the surface-active properties of the compounds of the present invention, the pyridinium salt prepared in Example I and potassium oleate were tested as emulsifying agents for n-heptane in water. The emulsifiers were dissolved in 100 cc. of water and 100 cc. of n-heptane was added. The mixtures were placed in graduated cylinders, shaken by hand for one minute each, and permitted to stand for 40 minutes. The level of the interface between the two phases was recorded after 10 and 40 minutes, and the percent of water separated was determined as follows:

Table A

| Emulsifier | Gms. Emulsifier | Percent Water Separated | |
|---|---|---|---|
| | | 10 Min. | 40 Min. |
| Pyridinium salt | 2.0 | 40 | 45 |
| Pyridinium salt | 0.2 | 70 | |
| Potassium oleate | 2.0 | 75 | 95 |

It is seen from Table A that the compound of the present invention gives a much more stable emulsion than potassium oleate. The good results of this invention show up particularly clearly after long periods, as only an additional 5% of the water separated between 10 and 40 minutes when the present emulsifier is used, whereas when potassium oleate was employed practically the entire emulsion had deteriorated at the end of 40 minutes.

EXAMPLE III

A butyl rubber latex was prepared with the emulsifier of Example I as the major emulsifier. A solution of 23% butyl rubber (molecular weight about 45,000) in hexane was prepared and two liters of the solution were mixed with two liters of water. 16.7 grams of the pyridinium chloride of Example I, 10.4 grams of Triton X-100, and 9.0 grams of polyvinyl alcohol were added, and the mixture was emulsified in a Rapisonic homogenizer for 5 minutes. The resulting latex was stripped to 37.6% solids, based on the latex, and 6% pyridinium chloride emulsifier based on the polymer (about 2.25% based on the latex), in a laboratory flask with heat and vacuum. The concentrated latex was characterized by its very small particle size, its high resistance to coagulation by high dilution and to mechanical coagulation, and its ability to impart adhesive properties to nylon cord of the type used in the construction of butyl rubber tires.

EXAMPLE IV

The mechanical stability of the latex prepared in Example III was compared with other butyl rubber latices which were prepared with commercially successful surface-active agents as the principal emulsifiers. The preparation of each latex was the same as that described in Example III except that the major emulsifier was different for each formulation. The emulsions were all stripped to ca. 20% solids, and 200 cc. of each were separately agitated in a Waring Blendor for 10 minutes. The coagulated rubber was removed by passing the mixtures through 100 mesh screen. The rubber was freed of included latex and weighed as a measure of the rubber coagulated. The results are tabulated in Table B.

Table B

| Major Emulsifier | Moles Emulsifier In Two Liters of 23% Butyl Rubber Solution in Hexane | Percent Coagulation After 10 Minutes In Waring Blendor |
|---|---|---|
| Potassium Oleate | .04 | 41.0 |
| Triton X-400 (Stearyl dimethyl benzyl ammonium chloride) | .06 | 50.3 |
| Pyridium salt of Example I | .04 | 0 |

The above data show clearly the superior degree of mechanical stability imparted by the emulsifier of Example I as compared with (1) a conventional latex based on potassium oleate, and (2) a latex stabilized with a commercially available cationic emulsifier.

Having thus set forth the general nature and illustrative embodiments of the present invention, the true scope is now particularly pointed out in the appended claims.

What is claimed is:

1. A cationic emulsifier selected from the group consisting of (I) 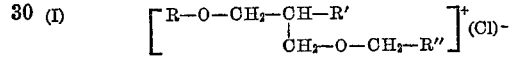

and (II) 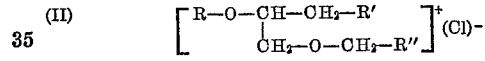

where R is an alkyl group having 8 to 13 carbon atoms, R' is an alkyl group having 6 to 11 carbon atoms and R" is selected from the group consisting of N-pyridyl, N-quinolyl and N-morpholyl radicals.

2. A cationic surface-active agent as in claim 1 wherein R" is N-pyridyl.

3. A cationic emulsifier as in claim 1 wherein R is a $C_8$ alkyl radical, R' is a $C_6$ alkyl radical and R" is N-pyridyl.

4. A stable latex of a hydrocarbon polymer comprising an emulsion of hydrocarbon polymer, water and a cationic emulsifier selected from the group consisting of (I) 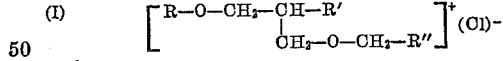

and (II) 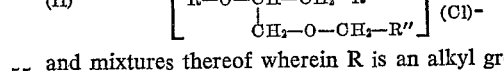

and mixtures thereof wherein R is an alkyl group having 8 to 13 carbon atoms, R' is an alkyl group having 6 to 11 carbon atoms and R" is selected from the group consisting of N-pyridyl, N-quinolyl and N-morpholyl radicals.

5. A stable latex as in claim 4 wherein the hydrocarbon polymer is a hydrocarbon copolymer of about 97 wt. percent isobutylene and about 3 wt. percent isoprene.

6. A stable latex as in claim 4 wherein the cationic surface-active agent is one wherein R" is N-pyridyl.

7. A stable latex as in claim 4 wherein the emulsifier is present in an amount of from 2–8 wt. percent based on polymer.

8. A stable latex as in claim 4 wherein a mixture of said cationic emulsifiers I and II is employed and wherein R is an octyl radical, R' is a hexyl radical and R" is N-pyridyl.

9. A process of producing cationic surface-active agents which comprises reacting at least one alcohol selected from the group consisting of

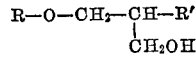

and

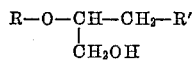

wherein R is an alkyl group having 8 to 13 carbon atoms and R' is an alkyl group having 6 to 11 carbon atoms, with formaldehyde, in an organic solvent for the reactants, passing hydrogen chloride through the reaction mixture, maintained at 20 to 100° C., until an organic phase and an aqueous phase are formed, separating the resultant chloromethyl ethers in the organic phase from the aqueous phase, and reacting the said ethers in an organic solvent with a heterocyclic amine selected from the group consisting of pyridine, quinoline and morpholine.

References Cited in the file of this patent
UNITED STATES PATENTS

| | | |
|---|---|---|
| 2,194,906 | Krzikalla et al. | Mar. 26, 1940 |
| 2,216,958 | Pannwitz et al. | Oct. 8, 1940 |
| 2,287,465 | Block | June 23, 1942 |
| 2,327,066 | Roelen | Aug. 17, 1943 |
| 2,595,797 | Leyonmark | May 6, 1952 |
| 2,683,698 | Bates | July 13, 1954 |
| 2,693,430 | Cross | Nov. 2, 1954 |
| 2,799,662 | Ernst et al. | July 16, 1957 |
| 2,809,948 | Hunter | Oct. 15, 1957 |